April 7, 1936. K. RÄNTSCH 2,036,499
OPTICAL PRINTING MACHINE FOR RETICULATED FILMS
Filed Feb. 16, 1935 8 Sheets-Sheet 1

Kurt Räntsch Inventor
By Gifford, Scull & Burgess Attorneys

April 7, 1936.  K. RÄNTSCH  2,036,499
OPTICAL PRINTING MACHINE FOR RETICULATED FILMS
Filed Feb. 16, 1935  8 Sheets-Sheet 2

Kurt Räntsch
Inventor
By Gifford, Scull & Burgess
Attorneys

April 7, 1936. K. RÄNTSCH 2,036,499

OPTICAL PRINTING MACHINE FOR RETICULATED FILMS

Filed Feb. 16, 1935  8 Sheets-Sheet 3

Kurt Räntsch
Inventor
By Gifford, Scull & Burgess
Attorneys

April 7, 1936. K. RÄNTSCH 2,036,499
OPTICAL PRINTING MACHINE FOR RETICULATED FILMS
Filed Feb. 16, 1935 8 Sheets-Sheet 4

Kurt Räntsch Inventor
By Gifford, Snell & Burgess
Attorneys.

April 7, 1936.  K. RÄNTSCH  2,036,499
OPTICAL PRINTING MACHINE FOR RETICULATED FILMS
Filed Feb. 16, 1935  8 Sheets-Sheet 5

Kurt Räntsch, Inventor
By Gifford, Scull & Burgess
Attorneys April 7, 1936. K. RÄNTSCH 2,036,499
OPTICAL PRINTING MACHINE FOR RETICULATED FILMS
Filed Feb. 16, 1935 8 Sheets-Sheet 6

Kurt Räntsch, Inventor
By Gifford, Scull & Burgess
Attorneys.

April 7, 1936.  K. RÄNTSCH  2,036,499
OPTICAL PRINTING MACHINE FOR RETICULATED FILMS
Filed Feb. 16, 1935  8 Sheets-Sheet 7

Kurt Räntsch, Inventor

Patented Apr. 7, 1936

2,036,499

UNITED STATES PATENT OFFICE 2,036,499

OPTICAL PRINTING MACHINE FOR RETICULATED FILMS

Kurt Räntsch, Teltow-Seehof, near Berlin, Germany, assignor to Opticolor A.-G., Glarus, Switzerland, a Swiss corporation Application February 16, 1935, Serial No. 6,842
In Germany February 14, 1934

8 Claims. (Cl. 88—24)

My invention relates to improvements in optical printing machines for reticulated films.

In order to obtain so sharp copies as the reticulation of the film will permit objectives having a relatively small aperture are employed in the devices disclosed in my copending patent application Serial No. 688,545 filed September 8, 1933 for projecting the original film on the copy film, i. e., objectives having an aperture which, as a rule, is by all means too small as to print all parts of the image corresponding to the different zones of the color film. To render nevertheless possible the printing of the parts of the image corresponding to the different colors means which are moved during the printing operation are used with the aid of which it is possible to view the aperture of the objective in succession from the films in the different directions corresponding to the filter zones during the recording and reproduction of the image.

The present invention relates to improvements in such printing machines, whereby a simplification of the optical and mechanical design is obtained so as to not only facilitate to a greater extent the manufacture of very accurately operating printing machines but also to enhance the life thereof. Also the use of copying objectives of smaller focal distance is thereby rendered possible.

The invention consists in so arranging the objective as to enable a movement thereof with respect to the exposure gate even during the printing of a minute image. In this manner the number of the other optical auxiliary means arranged in the path of light may be considerably reduced and the adjustment of the entire device is thus facilitated, the space for the auxiliary means required for the printing machines is greatly restricted and finally a considerable saving in light is attained. Furthermore, the life of the entire printing apparatus is much longer owing to the sturdy construction thereof.

There are substantially two different kinds of movements which may be imparted to the objective in the novel printing machine. In the one type of printing machines the objective is secured to a rotating carrier, so that it either rotates about an axis passing through the objective or about an axis lying externally of the objective. In the other type of printing machines the objective in some forms of the invention carries out a reciprocating movement whereas in the other forms of the invention the objective may be so designed that it need only move in parallel relation to itself without rotating during its movement. In the last-mentioned case the objective may be secured to a carrier which is suspended in the form of a double pendulum.

The novel printing machines in their simplest form are so designed that the objective together with two parallel mirrors is secured to a movable carrier. If both films are arranged as in the case of a standard printing machine opposite to one another so that they are perpendicular to the line connecting the centers of the images of the respective films (it being, of course, also possible to use bent film guides) the carrier for the objective with both parallel mirrors is so arranged as to rotate about the line connecting the centers of the images and the objective is placed externally of the axis of rotation, the optical axis being parallel to the former.

While this objective is viewed directly from the one film both parallel mirrors are so arranged at the other side that the aperture of the objective is viewed from the other film at the opposite side of the axis of rotation. Such a device may be further designed in various ways so that it may be employed to advantage for various purposes by choosing, for instance, in a suitable manner the angle enclosing both mirrors with the axis of rotation and by designing, for instance, the device in such a manner that it may be employed for the simultaneous production of various copies from the same original film.

The objective may, however, be so arranged between both parallel mirrors that the optical axis with the axis of rotation encloses an angle of preferably 90°. The axis of rotation passes then—when printing without varying the rate of scale—through the geometrical center of the objective, and both mirrors are so arranged externally of the rotation axis that aperture viewed from the films describes a circle about the axis of rotation.

It is apparent that the mirrors in the case of the above-described device as well as of all other devices according to the invention must be so arranged that an accurate projection of the still original film on the still copying film through the objective and the other auxiliary means is possible by arranging, for instance, the mirrors in such a manner that both films may be viewed from the objective in every position in the exact opposite directions. Furthermore, the films or the images of the films viewed from the projecting optical system must be always perpendicular to the optical axis of the system.

Also in the printing machines according to the present invention in which the objective moves in parallel relation to itself two mirrors which are arranged in the path of light are sufficient in the simplest case. The mirrors are rigidly connected with the objective and carry out together with the objective the oscillating movement. Both mirrors may be either parallel or perpendicular to one another and may be so arranged that the line of intersection of both mirror surfaces is perpendicular to the direction of motion.

When using films with cylindrical refracting microscopic elements the line of intersection of both perpendicular mirrors is at the same time perpendicular to the direction of the microscopic elements or to the images thereof viewed from the objective in stationary optical auxiliary means. (Plane mirrors as stationary means may be, for instance, employed which are arranged in the path of light and serve to interchange the right and left side of the image.) In such a case the oscillating movement is substantially parallel to the cylindrical refracting microscopic elements arranged on the film.

If both mirrors are either parallel or perpendicular to one another it is possible to replace one or both of the plane mirrors by an optical square in order to attain at the same time a reversal of the sides. Furthermore, it is thus possible in certain cases to choose more liberally the direction of movement which the objective together with the mirror should carry out.

Also in the case of devices with oscillating optical system the objective may be either arranged at the one side of the projecting surfaces or between the latter. Finally, it is also possible to construct an objective consisting of two symmetrical halves in such a manner that the plane mirrors may be arranged between both halves of the objective which have no longer a common optical axis.

The reflecting surfaces may be obtained either in a manner well known in the art by providing surfaces with a silver layer or by utilizing the total reflection of the surfaces of prisms made of glass or any other light transmitting material.

In such cases in which the optical axis of the objective is perpendicular to the direction of movement a stationary diaphragm may be arranged in front of the objective. The diaphragm is so designed that the objective aperture or the image thereof may be viewed from the films in certain directions which correspond to the filter zones or even only to the centers of the filter zones during the recording or reproduction of the image whereas the objective aperture is covered when it otherwise would be visible in the direction towards the boundary lines between the filter zones. This diaphragm may also be employed for covering the objective aperture during the advancement of the film. Such a device has the advantage over devices intercepting the path of light in the same instants in that it is possible to effect a very rapid, instantaneous and accurately regulable cutting on and off of the light without the use of any complicated mechanism.

The novel printing machines may be employed for printing as well as for enlarging or reducing the size of the images.

The devices according to the present invention may be further more improved by using not only one but various objectives which project at the same time the same original film on the same copy film, so that partial images which are in registry with one another on the original film are also in registry on the copy film. Consequently, the objective apertures are viewed at the same time from the films in different directions. Furthermore, every opening of such an objective is seen in succession in different directions. In this manner above all the advantage of a greater intensity of light of the printing optical system is attained. This is of great importance, since as a result of the small aperture of the objectives employed and the greater number of optically acting surfaces which are arranged in the path of light only a small portion of the light passing the original film reaches the printed film. By the use of several objectives the intensity of light of the entire printing optical system may be considerably increased.

Another advantage inherent in the use of various objectives lies in the fact that the printing machine may be so designed that various copy films may be obtained by one and the same original film, in which case, however, in contradistinction to similar processes hitherto known various partial images in registry with one another on the original film are also in registry on the copy film.

The accompanying drawings illustrate several embodiments of my invention in a diagrammatic form.

Figure 1:
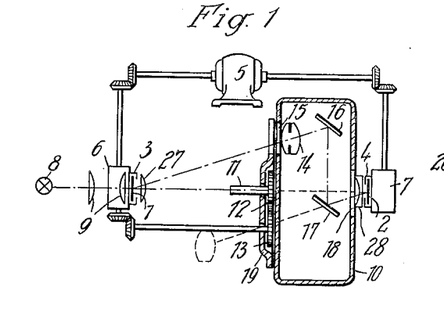
Fig. 1 is a diagrammatic view showing one form of apparatus which the invention may employ.

In the device shown in Fig. 1 both films 1 and 2 pass through both exposure gates 3 and 4 perpendicularly to the line connecting the centers of the images. The films are advanced by means of the claw mechanisms 6 and 7 driven by the motor 5. The original film 1 is illuminated by the light source 8 and the condenser lens 9.

A frame 10 is so disposed between both films as to rotate about an axis 11 which coincides with the line connecting the centers of the images, the frame being driven by the gears 12 and 13. When the frame completes a rotation the films are advanced by an image.

An objective 14 is so arranged in the frame that it lies externally of the axis of rotation, its optical axis, however, running parallel to the axis of rotation. The light coming from the original film after passing an opening 15 arranged in the frame passes through the objective 14 and is reflected by both mirrors 16 and 17 disposed in parallel relation to one another and reaches the copy film 2 through the opening 18. When projecting an image in the ratio of 1:1 the mirrors are so arranged that the path of light from film 1 to the objective is as long as the path from the objective to the film 2 by the way of the mirrors.

Figure 2:
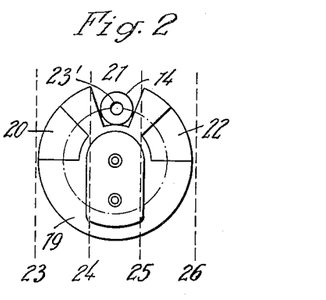
Fig. 2 is a diagrammatic view illustrating the diaphragm used in Fig. 1.

If the frame is now rotated when the film is at rest the objective aperture may be seen from the original film in different directions. The copy film is exposed in the intervals of time in which these directions coincide with such directions in which the filter zones are seen during the recording or reproduction of the image. To accomplish this a stationary diaphragm 19 which is shown in elevation in Fig. 2 is arranged in the neighborhood of the frame. The diaphragm 19 is provided with three openings in the form of sectors 20, 21 and 22. If the opening 23' of the objective 14 comes, for instance, behind the sector 21 it is viewed from the films in the same direction in which the central filter zone appears during the recording or the reproduction of the image. The directions and the sizes of the filter zones are indicated in Fig. 2 by the dash lines 23 to 26.

As well known in the art, a plurality of color records are formed behind each lenticulation of the original film by its exposure through a color filter having a plurality of zones.

If the objective is now rotated its aperture will be covered after a given time by the diaphragm 19, so that it may be seen again from the films only when it comes behind the sector 20. After the objective has passed the sector 20 it remains covered by the diaphragm 19 for a considerable time during which the films advance. The objective 14 appears then in the sector 22 whereby the copying of the next minute image is initiated. The sectors 20 and 22 are so arranged as to correspond to the lateral filter zones.

Since in the case of a uniform rotary motion of the objective the intervals during which the opening is seen in the sectors 20 and 22 are considerably longer than the interval during which the opening passes the sector 21 it may be of advantage to cover the openings 20 and 22 by neutral glasses, so that exposure of the copy film is the same for all three zones. By the use of such glasses it is generally possible to fix any ratio whatever of the exposures.

Also in the case of the novel printing machine it is also advantageous, as in the case of the prior art, if the entrance and exit pupils of the projecting objective fulfil certain conditions as to their position with respect to the films. This may be accomplished by arranging the lenses 27 and 28 as disclosed in Fig. 1 in the immediate neighborhood of the films 1 and 2 respectively, hereinafter called field lenses. The field lenses have at least approximately equal refractory forces in opposite direction, whereby faults inherent in the projection of images, for instance optical aberration, may be compensated for which are otherwise caused by the field lenses.

With the above described printing machine it is possible to copy films with whatever type of refracting microscopic elements. The latter may be cylindrical and have any direction with respect to the longitudinal directions of the films, care being taken to arrange the stationary diaphragm 19 in a manner corresponding to Fig. 2. But also films with spherical elements may be copied, if the filter, for instance, is composed of bands.

Figure 3:
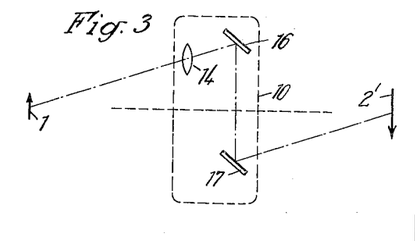
Figs. 3, 4, 5, 6, and 7 are diagrammatic views illustrating modifications of the structure shown in Fig. 1.

The slight modification to be effected in the optical part of the printing machine in case a film is to be printed with a different rate of scale is illustrated in Fig. 3. In this case the lengths of the paths of light from the original film 1 to the objective, on the one hand, and from the objective to the copy film 2' by the way of the mirrors, on the other hand, are directly proportional to the linear dimensions of the images. It is only then necessary to displace the mirror 17 farther away from the mirror 16 and at the same time to displace the film 2' farther away from the frame rotating about the line connecting the centers of the images. Otherwise the device may be also designed in the various manners as above described in connection with the Figs. 1 and 2.

Figure 4:
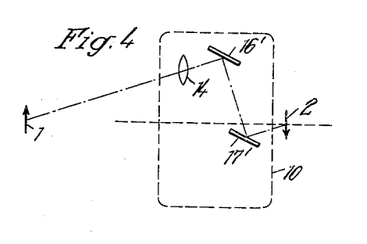
Figure 5:
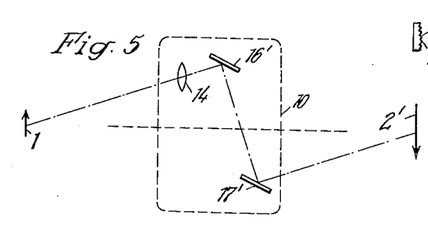

A modification which is sometimes of advantage is shown in Figs. 4 and 5. The devices shown in these figures correspond to those disclosed in Figs. 1 and 3 with the only difference that the mirrors 16' and 17' arranged in parallel relation to one another are inclined at other angles to the axis of rotation so that it is not necessary to arrange both mirrors in the same plane perpendicular to the axis of rotation. The device according to Fig. 4 serves to print without changing the rate of scale, whereas in the device corresponding to Fig. 5 the scale is changed in the ratio 1:2.

Figure 6:
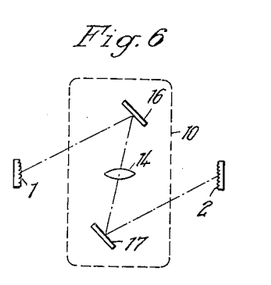
Figure 7:
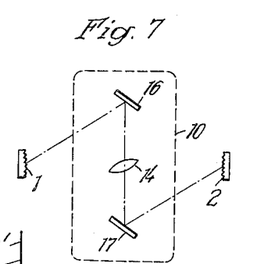

In contradistinction to the printing machines hitherto known the objective is arranged in the printing machine according to Figs. 6 and 7 between both parallel mirrors. Such a device may be of advantage if the focal length of the copying objective is very small, since in this case there is not sufficient room to accommodate both mirrors at the same side of the objective. On the other hand, it is not possible in such devices to use a stationary diaphragm in front of which the objective passes, but particular means must be provided in order to intercept the path of light such as for instance the revolving diaphragm as disclosed in the patent application Serial No. 688,545 filed September 8, 1933.

In the device according to Fig. 6 the objective 14 is so arranged in the frame 10 rotating about the line connecting the centers of the images that its optical axis is perpendicular to said connecting line. In the case of a 1:1 projection both mirrors 16 and 17 are placed at an equal distance from the objective.

In the device shown in Fig. 7 the objective is inclined to the connecting line so that its optical axis encloses an acute angle with the axis of rotation. The mirrors 16 and 17 are accordingly placed at a somewhat different point and enclose corresponding angles with the axis of rotation. The design of the apparatus disclosed in Figs. 6 and 7 may be substantially the same as that of the device shown in Fig. 1. In the devices shown in Figs. 6 and 7 the angles must be so chosen that the images viewed from the objective are perpendicular to the optical axis.

Figure 8:
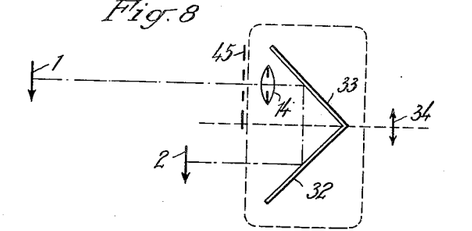
Figs. 8 and 9 are diagrammatic views showing a different principle upon which the invention may operate.
Figure 9:
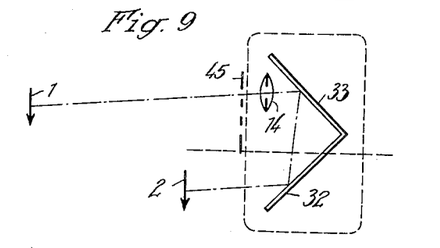

The principle of such printing optical systems in which the objective is shifted with the mirrors in parallel relation to itself is described in details with reference to Figs. 8 and 9. Both figures show the same device in various positions of the oscillating part. The film 1 is projected by the objective 14 on the film 2. Between the objective and the copy film are placed the two mirrors 32 and 33 perpendicular to one another, the line of intersection of both mirrors being perpendicular to the plane of the drawing. The mirrors are rigidly secured together with the objective 14 to a frame. The refracting microscopic elements of the films run in parallel relation to the line of intersection of the mirrors 32 and 33. Longitudinally and transversely reticulated films may in this case be taken into consideration. All printing machines according to the present invention may, however, be also utilized for copying films with spherical lens elements. The printing apparatus with oscillating optical system may, for instance, be always employed if the multizone filter consists of bands lying close to one another, regardless of the form of the refracting microscopic elements.

When an image is being copied the objective with the mirrors moves to and fro in the direction of the double arrow 34 so that its central position corresponds to the position shown in Fig. 8, whereas the end position is shown in Fig. 9. If the length of the path of light from film 1 to the objective 14 is equal to that from the objective 14 to the film 2 by the way of the mirrors, the film 1 is exactly projected on film 2 in every position of the objective and of the angular mirrors, and in the different positions of the objective the lateral zones or the central zone are copied.

Figure 10:
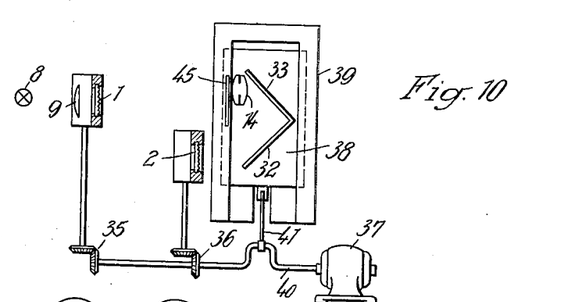
Fig. 10 is a view illustrating one form of apparatus which may be used to operate the means shown more diagrammatically in Figs. 8 and 9.
Figure 11:
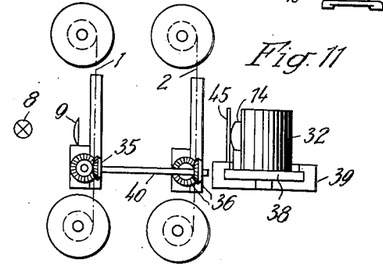
Fig. 11 is a vertical sectional view taken through the structure shown in Fig. 10.
Figure 12:
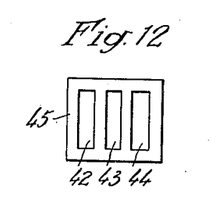
Fig. 12 is a face view of the diaphragm shown in Figs. 10 and 11.

The embodiment of a copying device designed according to the above described principle is shown in Figs. 10, 11 and 12.

Film 1 is illuminated by the light source 8 and the condenser 9. The film advancing mechanisms for the films 1 and 2 are driven by the motor 37 through the conical gears 35 and 36.

Since a projection of the original film on the copy film which does not change its position during the movement of the objective, is only possible if the objective moves exactly perpendicularly to the line of intersection of the mirrors 32 and 33; the latter together with the objective 14 may be preferably secured to a slide 38, which moves to and fro in the frame 39. The slide is reciprocated by means of a cranked shaft 40 with the aid of a connecting rod 41. A plane diaphragm 45 is preferably arranged in front of the objective and is provided with sectors so that the objective may be viewed from the films when its aperture lies in such directions in which the zones of the color filter lie during the recording or reproduction of the image. The elevation of this diaphragm is shown in Fig. 12. It has three openings 42, 43 and 44.

Figure 13:
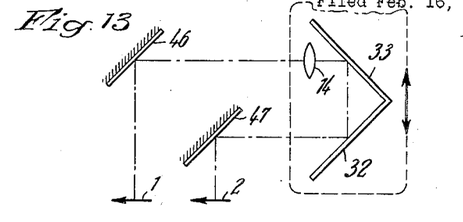
Figs. 13 to 41, inclusive, are diagrams showing different forms of apparatus which may be used in the practice of the invention.
Figure 18:
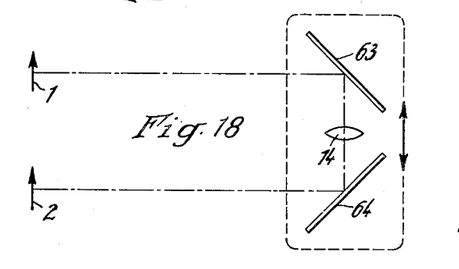
Figure 19:
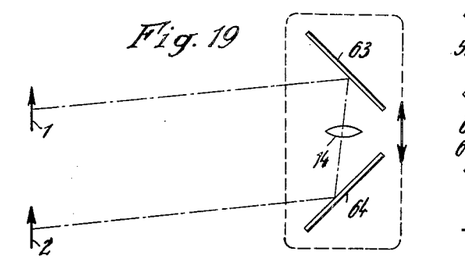

Certain simplifications may be effected in the arrangement of the film advancing mechanisms, if stationary plane mirrors are arranged in the path of light in the printing machines based on the principle of Figs. 18 and 19. Such a device is, for instance, shown in Fig. 13. In this device the stationary mirrors 46 and 47 are inclined at an angle of 45° to the oscillating direction so that both films 1 and 2 lie in the same plane. It is then very simple to effect an exact and uniform advancement of both films.

Figure 14:
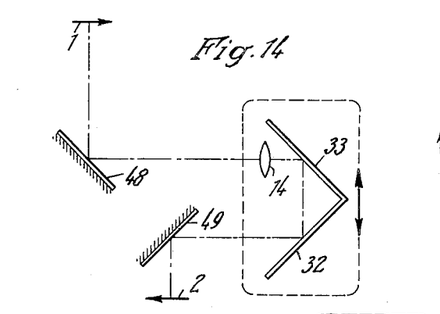

On the other hand, it may be of advantage, if, for instance, transversely reticulated films are to be copied, to separate both exposure gates as far as possible. In this case the apparatus according to Fig. 14 is preferably used. In this apparatus the stationary mirrors 48 and 49 are so arranged in the path of light that the films 1 and 2 lie in different parallel planes.

Since with the copying apparatus according to Figs. 8 to 14 a reversal of the sides is attained an optical square may be substituted for one of the plane mirrors in order to eliminate this drawback. The edge of the angular mirror which replaces in this case the plane mirror assumes then the same position as the corresponding mirror in one of the Figs. 8 to 14. The objective 14 together with three plane mirrors may, therefore, either be secured to the reciprocating slide or one of the stationary mirrors 46 to 49 is designed as angular mirror. The designs resulting from the above considerations will be hereinafter described more in detail.

The printing machines with oscillating optical system so far described are only suitable for the production of copies having the same scale as the original, whereas a copying when varying the rate of scale is not possible. In order to produce copies with enlarged or reduced scale with the aid of an oscillating optical system such devices must be used as are illustrated, for instance, in Figs. 15 and 16 or 17 and which are characterized by the fact that various plane mirrors are associated with the oscillating objective in such a manner that the light is reflected between these mirrors and stationary mirrors provided in addition. While, for instance, the image of an object at rest projected by a single angular mirror carries out a motion the path of which is twice as great as that of the mirror itself a multiplication of the path along which the image passes can be obtained by the arrangement of various angular mirrors placed in series which are alternately still and moved with respect to the exposure gate.

Figure 15:
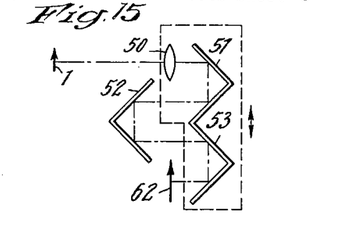
Figure 16:
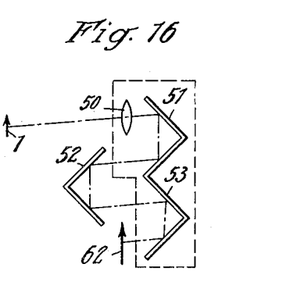

In Fig. 15 the light coming from the original film 1 passes first through the objective 50 and then reaches the copy film 62 when reflected on the surfaces of the angular mirrors 51, 52 and 53. Both angular mirrors 51 and 53 together with the objective 50 are secured to a reciprocating carrier whereas the angular mirror 52 is disposed in fixed relation to the exposure gate. The oscillation takes place in the direction of the double arrow. Fig. 15 shows the central position. One of the lateral positions is shown in Fig. 16. With this device the scale may be changed in the ratio of 1:3 so that also the length of the path of light from film 1 to the objective 50 is ⅓ of the length of the path of light from the objective to the film 62 by the way of the angular mirrors.

Figure 17:
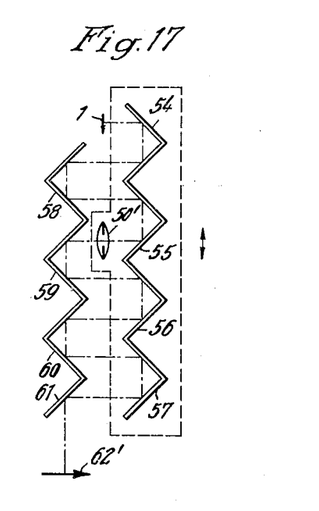

Another printing machine by which it is possible to enlarge the scale in the ratio of 3:5 or to reduce it in the ratio of 5:3 is shown in Fig. 17. The angular mirrors 54 to 57 are rigidly connected to the objective 50′ and reciprocate in the direction of the arrow. The angular mirrors 58 to 60 and the plane mirror 61 are rigidly arranged. The path of light from the original film 1 via the mirrors and the objective to the copy film 62′ is readily apparent from the figure.

In the Figs. 8 to 17 the objective moves perpendicularly to its optical axis so that it is possible to use a comb-like diaphragm in fixed relation to the film and to utilize as above described the advantages resulting therefrom.

In some of the printing machines hereinafter described it is not possible to use such a comb-like diaphragm. In this case a particularly compact design is, however, attained which is then of particular importance if objectives of small focal length must be used in order to adapt the same to the taking and projecting image objectives.

In the device in Figs. 18 and 19 which show the oscillating optical system in the central and one of the lateral positions in a plan view, a plane mirror 63 and 64 respectively is placed between the objective 14 and each of the two films 1 and 2. Both mirrors are perpendicular to one another so that the line of intersection of the two planes is perpendicular to the direction of movement indicated by the double arrow. The axis of the objective runs parallel to the direction of the oscillating movement. The advantage of using objectives of small focal length consists in the fact that only one mirror is placed between the objective and one of the films.

Figure 20:
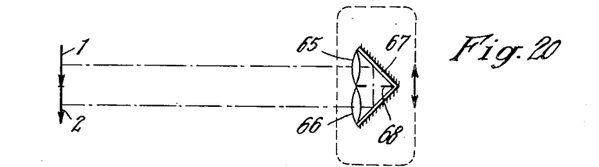
Figure 21:
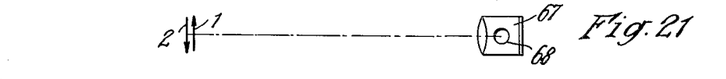

In the embodiment shown in Figs. 20 and 21 in plan view and side elevation an objective is used which is symmetrical and consists of two halves 65 and 66 which may be arranged in spaced relation to one another to such an extent that the angular mirror 67 can be placed between the two halves. The light then passes from the original film 1 through the first half 65 and is reflected on the surfaces of the angular mirror 67 whose edge is also perpendicular to the direction of the oscillating or the reciprocating movement and then through the second half 66 of the objective to the copy film 2. The oscillation is effected in the direction of the double arrow of Fig. 20.

The refracting microscopic elements run perpendicularly to the plane of the drawings. Such a device presents the advantage that a comb-like diaphragm in fixed relation to the film gate may be used also in the case of a small focal length of the copying objective. However, such symmetrical objectives whose halves may be sufficiently spaced from one another are relatively rare so that, as a rule, special constructions have to be resorted to. The diaphragm of the objective is placed between both mirrors and is illustrated in the figures at 68.

Figure 22:
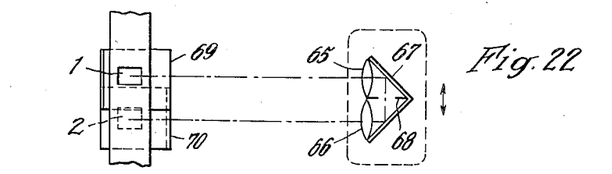
Figure 23:
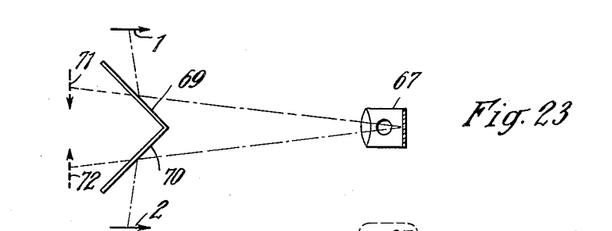

To overcome the difficulty inherent in the above-described embodiment that the films must be advanced very close to one another in the same plane the modifications shown in Figs. 22 and 23 may be taken advantage of. In order to have an idea of the connection between this arrangement and that according to Figs. 20 and 21 it is at first assumed that the films 1 and 2 of Fig. 21 move in an upward and downward direction an equal distance so that they reach the positions 71 and 72. The plane mirrors 69 and 70 are so arranged between 71 and 72 and the halves of the objective that their line of intersection runs parallel to the oscillating movement of the objective and that the films 1 and 2 shown in Fig. 23 are viewed from the halves of the objective at 71 and 72.

Figure 24:
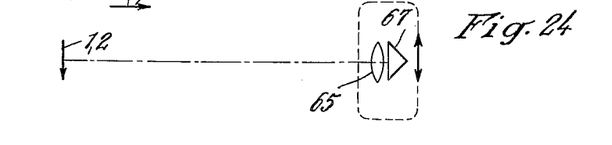
Figure 25:
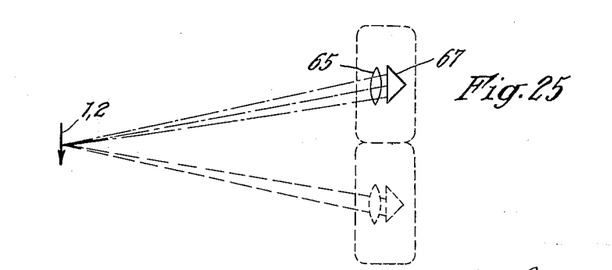
Figure 26:
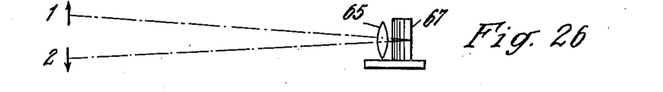

The last-described modifications, in which an objective consisting of two symmetrical halves which under circumstances may be replaced by two entirely equal objectives is employed, may be simplified by using as illustrated in Figs. 24 to 26 only the one half of the objective and by arranging behind the same an angular mirror.

The Figs. 24 and 25 show a plan view, Fig. 24 in the central position, Fig. 25 in both end positions, and Fig. 26 shows a side elevation. The two films 1 and 2 are placed somewhat above and below the optical axis of one half 65 of the objective behind which the angular mirror 67 is so placed that the edge thereof runs in parallel relation to the refracting microscopic elements on the film and perpendicularly to the direction of the oscillating movement indicated by the double arrow in Fig. 24. In the device according to Figs. 24 and 25 every ray returns again to the same point it came from, whereas in the side elevation shown in Fig. 26 an object placed above the optical axis is projected in the ratio 1:1 on an object arranged symmetrically below the optical axis if the object is placed at a distance from the half 65 of the objective corresponding to the focal length. The angular mirror 67 is located at such a distance behind the half 65 of the objective that the path of a ray from the half 65 of the objective via the angular mirror and back to this half of objective has the same length as if instead of the angular mirror the other half of the objective would be placed behind the first one. Also in this case the half 65 of the objective may under circumstances be replaced by a complete objective which is preferably corrected to a projection of its focal plane to infinity.

Figure 27:
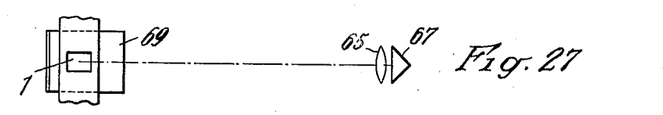
Figure 28:
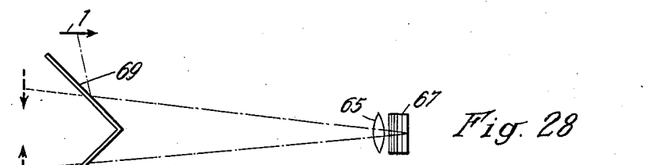
Figures 29, 30, 31, 32, 33:
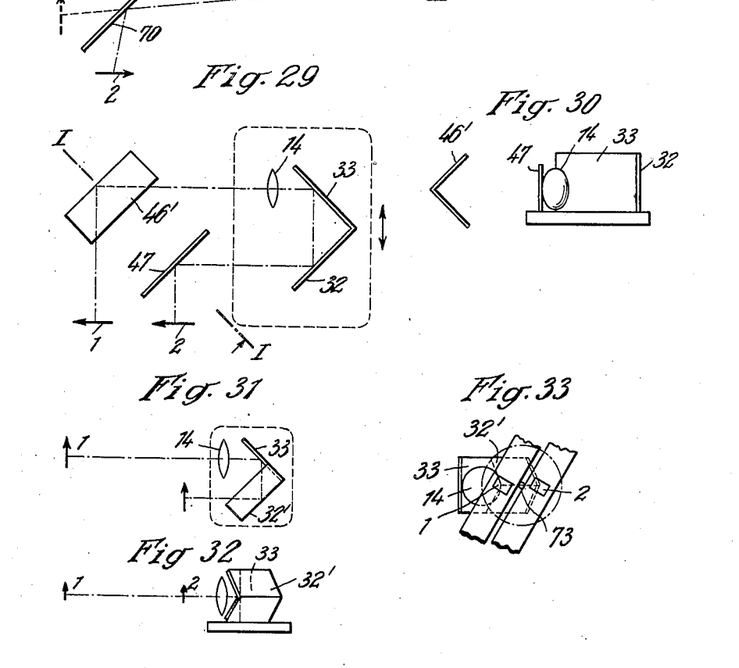

The modification illustrated in Figs. 27 and 28 differs from the device disclosed in Figs. 29 and 30 in the same manner as the device according to Figs. 24 and 26 from the device shown in Figs. 27 and 28 so that no further explanation is necessary.

It has already been stated that in the case of an optical system carrying out a reciprocating movement and consisting of an objective and two or another even number of reflecting surfaces it is necessary to replace one of the plane mirrors by an optical square in order to prevent a reversal of the sides. In this manner a triple mirror is formed consisting of three planes perpendicular to one another.

The optical square may be of the stationary type. A device is then obtained as shown in Figs. 29 and 30. Fig. 29 shows a plan view of a device corresponding substantially to that disclosed in Fig. 13. The difference lies in the fact that the mirror 40 is replaced by an angular mirror 46' whose edge is inclined at an angle of 45° to the optical axis and runs in a plane determined by the optical axis and the direction of the oscillating movement. Fig. 30 shows a vertical sectional view of the device taken on the line I—I of Fig. 29.

It is, however, preferable to replace one of the oscillating plane mirrors by the optical square. It is then possible to employ more convenient means for the production of the oscillating or reciprocating movement. In the case of the devices with oscillating or reciprocating movement of the objective so far described this motion had to be carried out according to a straight line, since a departure from the straight line would have prevented that the image remains still on the copy film. If, however, one of the oscillating mirrors is designed as optical square the position of the image projected by the optical system would not be changed in the case of a departure from the linear movement in a direction which is perpendicular to the oscillating movement and to the direction of the optical square.

The optical square reflects the rays obliquely in a downward direction when it is removed from its own plane in the upward direction, so that the image does not change its position. Consequently, it is possible to suspend such oscillating devices, for instance, as a double pendulum or four oscillating arms, thus rendering it possible to use a more precise and durable mechanism.

In all devices with an oscillating objective and oscillating mirrors so far described one of the plane mirrors moved with respect to the film gate may be replaced by an optical square. The most important embodiments will be hereinafter described with a brief reference to the corresponding figure as above illustrated from which the novel device is to be derived.

The device illustrated in Figs. 31 and 32 corresponds to the arrangement according to Figs. 8 and 9. The difference lies in that the plane mirror 32 of Figs. 8 and 9 is replaced by the optical square mirror 32'. Its edge runs in the plane determined by the optical axis and the direction of the oscillating movement of the objective.

It will be apparent that such a device not only carries out an oscillating movement in such a direction that it moves approximately in the plane of the Fig. 31 but it may be also used in such a manner that it carries out a movement perpendicular to the first-named movement and lying substantially in the plane of Fig. 32. While it was at first assumed that the device according to Figs. 31 and 32 serves to copy films in which the cylindrical refracting microscopic elements are perpendicular to the plane of Fig. 31 of the drawings it is possible when moving the objective in a corresponding manner to copy films with any other direction of the lens elements by the aid of the triple mirror.

Without modifying the device the latter may be oscillated in a direction which is perpendicular to the direction of the refractive microscopic elements. It is also, however, possible to cause the entire device to rotate about an axis, the device being, however, in this case always shifted in parallel relation to itself.

How the movement is to take place when the objective with the triple mirror is caused to rotate in the last-mentioned manner will be seen from Fig. 33 which illustrates a view from the side of the films in the direction of the optical axis. The films 1 and 2 run, for instance, obliquely to the horizontal. The objective 14 is so arranged that its optical axis passes through the center of the image 1. The triple mirror 32', 33 is arranged behind the objective 14 as disclosed in Figs. 31 and 32. The entire device is then caused to rotate in such a manner about an axis perpendicular to the plane of the drawings and passing through point 73 that the device always remains parallel to itself. In front of the objective a diaphragm in fixed relation with respect to the exposure gate is preferably arranged which is also designed in the same manner as that employed for the above described devices with oscillating optical system.

Figure 34:
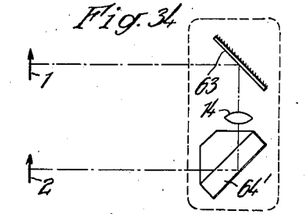
Figure 35:
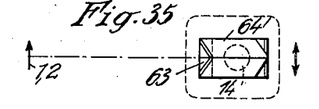

The same applies to the device shown in Figs. 34 and 35 which differs from that disclosed in Figs. 18 and 19 in that the plane mirror 64 is replaced by the angular mirror 64'. Also this device may be employed to carry out a movement in the plane of Fig. 34 or perpendicularly thereto or any movement in a plane passing through the optical axis of the objective and is perpendicular to the plane of the drawings of Fig. 34. The use of a comb-like diaphragm in fixed relation to the film gate is, however, only possible if the movement is perpendicular or substantially perpendicular to the plane of the drawings of Fig. 34.

Figure 36:
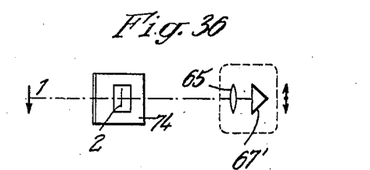
Figure 37:
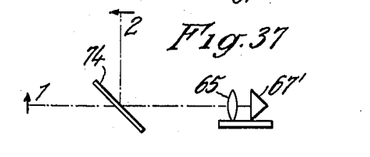

A particular case presents itself if the devices according to Figs. 20, 21 or 24 to 26 are equipped with an oscillating triple mirror. Since an optical system together with a triple mirror reflects the entire light in the same direction from which the light comes it is necessary to arrange in the path of light a semi-reflecting and semi-transmitting surface. Such a device is shown in Figs. 36 and 37. Fig. 37 corresponds to Fig. 26. The light comes from the original film passes partially the semi-transmitting surface 74 reaches through the objective or the half 65 of the objective the triple mirror 67' which may be arranged with respect to the objective in any desired manner, returns through the objective 65 and reaches after reflection on the semi-reflecting surface 74 the copy film 2. A plan view of such a device shown in Fig. 36 corresponds to Fig. 24. The semi-reflecting surface 74 is preferably so arranged that it is in parallel relation to the main direction of the oscillating movement.

Figure 38:
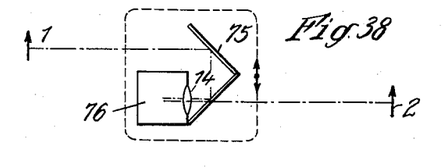
Figure 39:
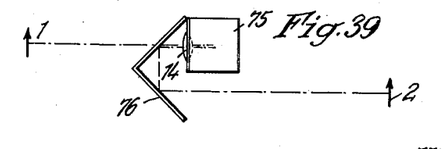

Another embodiment of a device according to the invention is shown in Figs. 38 and 39. The objective 14 is so arranged between two angular mirrors 75 and 76 rigidly connected to the objective that the edges of the angular mirrors are perpendicular to one another. The path of light from the original film 1 via the angular mirror 75, the objective 14 and the angular mirror 76 to the copy film 2 is apparent from the Figs. 38 and 39. The oscillating movement of such a device may be carried out either in the plane of the Fig. 38 or in the plane of Fig. 39. If the arrangement is carried out in such a manner that the device moves in parallel relation to the double arrow of Fig. 38, the angular mirror 76 may be arranged also as still mirror.

It is also possible to provide in these devices diaphragms in front of which the objective passes, the diaphragms being in fixed relation to the exposure gate.

Figure 40:
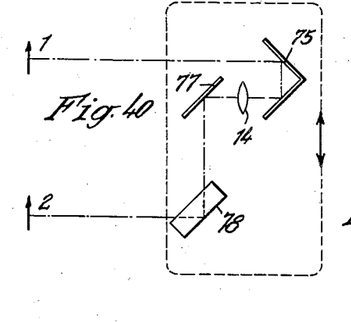

If it is desired to modify the last-described device in such a manner that both films lie in the same plane a device as shown in Fig. 40 may be employed. The latter corresponds to Fig. 38. The light coming from the film 1 and reflected on the surfaces of the angular mirror 75 reaches after passing the objective 14 at first the simple plane mirror 77 by which it is reflected on the angular mirror 78. The edge of this mirror also lies perpendicularly to the edge of the angular mirror 75 and besides runs in parallel relation to the plane mirror 77. The light reflected by the angular mirror 78 then reaches the copy film 2. The oscillating movement may be carried out in the plane of Fig. 40 as well as perpendicularly thereto.

Figure 41:
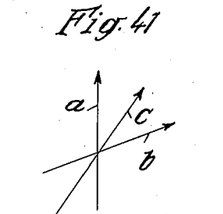

In some cases it is important to also employ the novel devices for copying if it is desired that the films be provided with cylindrical refracting microscopic elements, which form on the original and on the copy film with the edges of the image angles differing from one another. This angle between the directions of the elements may amount, for instance, to 30°, 45° or 90°. The devices according to the invention which carry out substantially a reciprocating movement are then so arranged that the main direction of their movement bisects the angle between the directions of the refracting microscopic elements. If, for instance, a device as disclosed in Figs. 31 and 32 is employed and if the directions of the elements are viewed from the objective in the directions indicated by the arrows a and b of Fig. 41 the optical system with the mirrors may be oscillated in the direction indicated by the arrow c.

Figure 42:
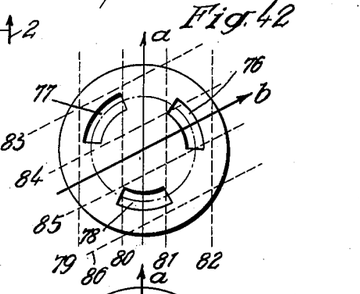
Figs. 42 and 43 are face views of the diaphragms which may be employed in the practice of the invention.
Figure 43:
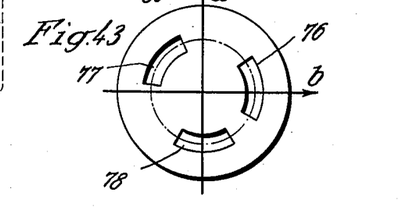

If, on the other hand, an optical system is employed for copying films with crossed directions of the elements which optical system carries out a circular movement, for instance, as shown in Fig. 1 or in Fig. 33, it is preferable to use a diaphragm which has the form shown in Fig. 42 or 43. Such a diaphragm replaces the one shown in Fig. 2.

In Fig. 42 the directions of the elements are again indicated by the arrows a and b. The diaphragm is provided with the openings 76, 77 and 78, the position of which may be determined as follows: The zones of the color filter during the taking process are so viewed from the film whose direction of the elements runs parallel to the arrow a—it may be assumed that this is the original film—that they lie between the dotted lines 79 to 82. The zones of the color filter follow one another during the taking process, for instance, in the sequence green, red, blue. The color zones viewed from the other film during the reproduction and which must run in parallel relation to the direction of arrow b lie between the dotted lines 83 to 86. The sequence of the colors on this filter is green, blue, red so that the color of the central zone is interchanged with the color of one of the lateral zones with respect to the taking filter. Diaphragm apertures are applied at all points where two zones of the same color cover one another in the manner shown in Fig. 42.

The filter shown in Fig. 43 differs from that disclosed in Fig. 42 only in that the directions of the refracting microscopic elements which run parallel to the arrows a and b are perpendicular to one another. The arrangement of the diaphragm apertures is the same.

In such cases in which the optical system does not move perpendicularly to the direction of the optical axis but in such a direction that it is not possible to arrange a stationary diaphragm in such a manner that the system must pass in front of the diaphragm, the means which intercept the path of light and which cause, for instance, a covering of the light source illuminating the original film must be so designed that the exposure only takes place when the objective aperture is seen in the directions in which the apertures of the diaphragms shown in Figs. 42 or 43 would lie.

Figures 44, 45, 46, 47, 48, 49:
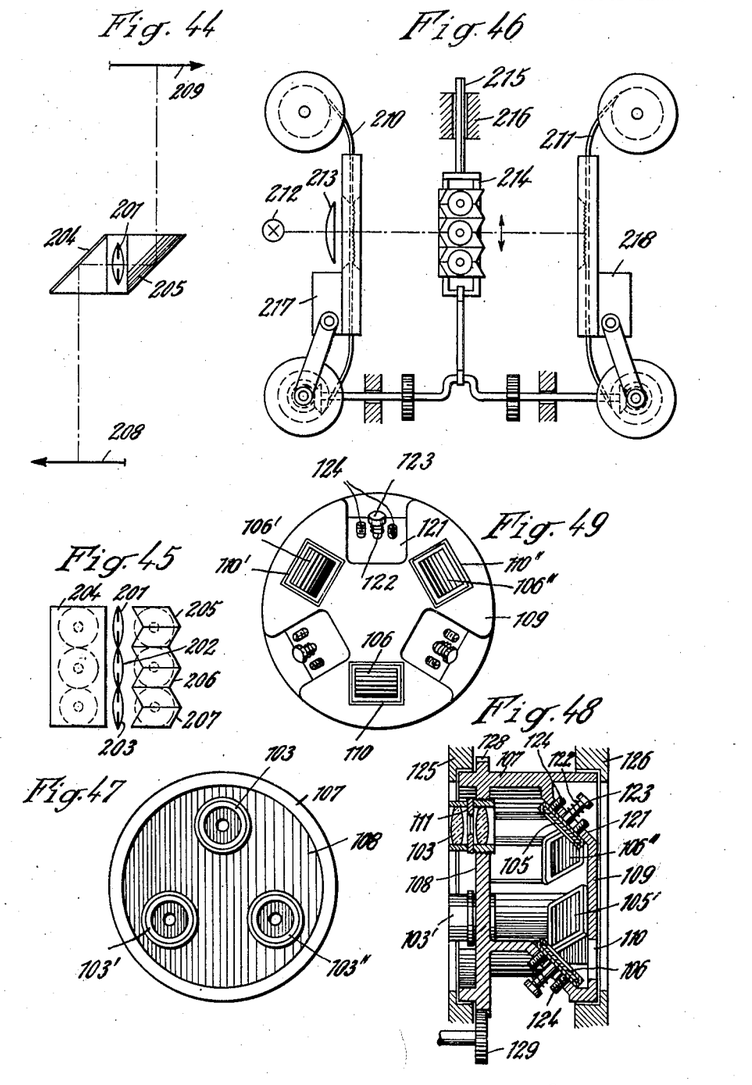
Figs. 44 and 45 are diagrams illustrating another principle according to which the invention may be practiced.
Fig. 46 is a view showing one means for operating according to the principle outlined in Figs. 44 and 45.
Fig. 47 is a view of the structure appearing in Fig. 48 as seen from the left of that figure.
Fig. 48 is a vertical sectional view through the structure appearing in Fig. 47.
Fig. 49 is a view of the structure appearing in Fig. 48 as seen from the right of that figure.

Figs. 44 to 46 show a device in which three objectives 201, 202 and 203 are arranged one above another in such a manner that by means of plane mirrors they simultaneously project an image 208 of the original film on the same point 209 of the copy film. Figs. 44 and 45 show a top view and a view of the optical part essential to the invention, whereas Fig. 46 shows a view of a complete printing system.

The light passes from the original film 208 via the obliquely arranged plane mirror 204 through the three objectives 201, 202 and 203 and thence via the three angular mirrors 205, 206, 207 to the copy film 209. The edges of the angular mirrors are arranged in parallel relation to the mirror 204. Diaphragms are preferably provided in the objectives so that only one small circular opening of each objective is free.

As will be seen from Fig. 46 the three objectives with the plane mirrors are secured to a frame 214. The latter is slidably mounted in a bearing 216. The films 210 and 211 on which are placed the images 208 and 209 are advanced with the aid of claw mechanisms 217 and 218. A crank shaft which moves the frame 214 in the upward and downward direction is connected with the drive for the claw mechanisms. When the films are motionless the frame moves once in the upward or once in the downward direction. The amplitude of the oscillation of this frame may, for instance, be equal to the half distance of two objective apertures. The amplitude may under circumstances be also chosen somewhat smaller, in order to prevent those points of the photographical layer which correspond to the boundary lines between the filter zones of different colors from also being copied.

The device disclosed in Figs. 44 to 46 may be modified in various ways. Both films may, for instance, be arranged close to one another and the angular mirrors so placed that their angular edges are perpendicular to the plane of the mirror 204.

Figure 50:
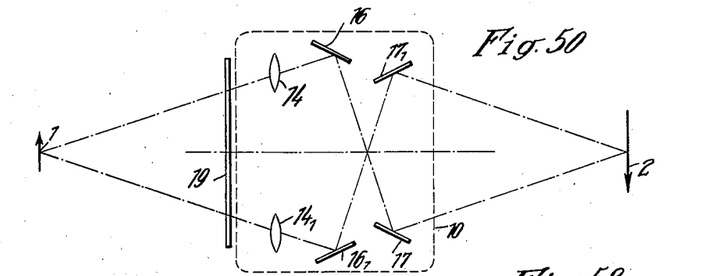
Fig. 50 is a diagram illustrating the operation of structure appearing in Figs. 47, 48, and 49.
Figures 51, 52, 53, 54, 55:
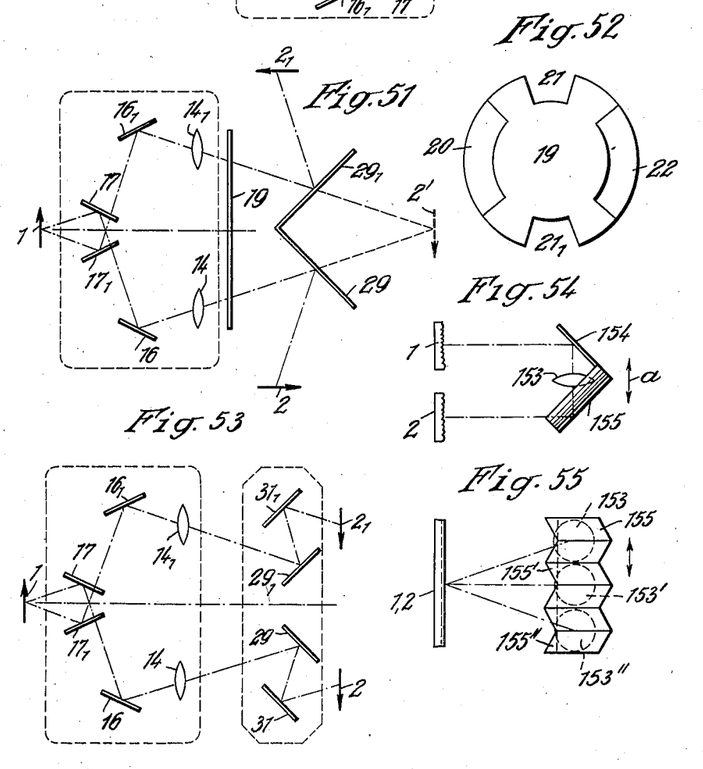
Fig. 51 is a view similar to Fig. 50, but illustrating a modification thereof.
Fig. 52 is a view of the diaphragm appearing in Figs. 50 and 51.
Fig. 53 is a diagram illustrating a further modification of the structure appearing in Fig. 51.
Figs. 54 and 55 are views taken at right angles to each other and illustrating still another form of the invention.

The principle of another device according to the invention in which the means moved with respect to the film gate do not carry out an oscillating but a rotating movement is shown in Fig. 50. The original film 1 is projected on the copy film 2 by means of the objectives 14 and 14₁ through the pairs of parallel mirrors 16, 17 and 16₁, 17₁ respectively. If the copy should be of the same size as the original the objective must have the same distances from the films 1 and 2 or from the images seen in the mirrors. In the embodiment shown in Fig. 50 the case is illustrated in which the copy is about twice as large as the original film. The objectives with the mirrors are so arranged in the reel that the latter may rotate about the line connecting the both centers of the images while both films are motionless. In this case the objectives may pass in front of a comb-like diaphragm 19 the top view of which is shown in Fig. 52 and which prevents the image portions corresponding to the boundary lines between the filter zones from being copied. The openings of the comb-like diaphragm may be partially occupied by the neutral glasses 20 and 22.

In Figs. 47, 48 and 49 is shown a copying optical system designed on the principle of Fig. 50. Fig. 48 shows a cut through the axis about which the movable parts rotate. Figs. 47 and 49 show two views of the rotating part viewed from two opposite sides.

This part consists essentially of a reel 107 rotatably mounted in the bearings 125 and 126 and driven by the toothed rim 128 meshing with the gear 129. The drum is provided with three objectives 103, 103' and 103'' which are displaced 120°. Behind each objective a pair of parallel mirrors is disposed, i. e., for instance, behind the objective 103 the two mirrors 105 and 106. The light coming from the original film passes the small punctual opening in the diaphragm 111 of the objective 103 and reaches the copy film through the mirrors 105, 106. It is, however, also possible to reverse the path of light so that the mirrors face the original film. At the same time the light passes also through the objectives 103' and 103'' as well as through the mirrors corresponding to these objectives. Consequently, in every position of the reel 107 various points of the photographical layer are copied. Furthermore, the objectives move so that each objective one after another serves to copy various points.

In Fig. 49 the mirrors 106, 106' and 106'' may be seen through the openings 110, 110' and 110''.

The screws 124 serve to adjust the mirrors cemented on the base plate which are drawn towards the screws 124 with the aid of the bolts 123 and of the springs 122.

Fig. 51 illustrates the principle of a printing device in which two copies may be simultaneously obtained on the films 2 and 2₁ from one and the same original film 1. If one considers the objectives 14 and 14₁ with the pairs of parallel mirrors 16, 17 and 16₁, 17₁ one will see that this device corresponds in principle to that shown in Fig. 50.

The original film 1 to be copied replaces the copy film 2 according to Fig. 50 and the image 2' of the copy films 2 and 2₁ reflected by the plane mirrors 29 and 29₁ replaces the original film 1 of Fig. 50. The objectives move again in front of a diaphragm 19 which has the form shown in Fig. 52. The axis of rotation of the reel containing the objectives and the movable plane mirror coincides with the line connecting the center of the film image 1 with the center of the film image 2'.

A modification of the device shown in Fig. 51 is illustrated in Fig. 53. This device differs from the one shown in Fig. 51 in that the rays of light after reflecting on the mirrors 29 and 29₁ are reflected on the films 2 and 2₁ by the reflecting surfaces 31 and 31₁ disposed in pairs parallel to the mirrors 29 and 29₁. In this manner the advantage is obtained in that both copy films run in the same plane so that it is easier to accommodate a common driving mechanism.

Figs. 54 and 55 show a plan view and a view of a copying device consisting of three objectives 153, 153' and 153" disposed one above another. In front of each objective the plane mirror 154 is placed at the one side, whereas the angular mirrors 155, 155' and 155" are arranged at the other side. The rays coming from the original film 1 are reflected on the plane mirror 154, pass through the objectives 153, 153' and 153" and after reflecting on the surfaces of the angular mirrors 155, 155' and 155" reach the copy film 2. The original film and the copy film may be interchanged with one another. The edges of the angular mirrors are perpendicular to the plane mirror 154.

The objectives with the plane mirrors may either be parallel to the direction of the double arrow $a$ or may oscillate in parallel relation to the direction of the double arrow $b$. The direction of the refracting microscopic elements may be parallel to one of the two double arrows. However, the direction may also enclose with one of the two arrows an angle. If the direction of the oscillating movement is perpendicular to the direction of the refracting microscopic elements the number of the objectives is arbitrary. Otherwise the number of the objectives preferably corresponds to the number of the filter zones of different colors used for the recording or reproduction of the images.

I claim as my invention:

1. In combination, an original film having thereon a multiplicity of lenticulations of substantially equal aperture and a group of color records behind each of said lenticulations, a copy film having similar lenticulations thereon, film gates at which said films are exposed, means for passing light through the original film to the copy film, optical means in the path of said light from the original film to the copy film and including a lens of aperture smaller than that of one of said lenticulations and disposed at one side of an axis normal to and passing through one of said films in its gate, and means to rotate said optical means bodily about said axis.

2. In combination, an original film having thereon a multiplicity of lenticulations of substantially equal aperture and a group of color records behind each of said lenticulations, a copy film having similar lenticulations thereon, film gates at which said films are exposed, means for passing light through the original film to the copy film, optical means in the path of said light from the original film to the copy film and including a lens of aperture smaller than that of one of said lenticulations, means for moving said lens bodily, transversely of said path of light, to an extent sufficient to virtually increase the aperture of the lens to an amount approximately equal to that of one of said lenticulations, and a stationary diaphragm having openings corresponding in number and position to said color records and positioned to permit passage of said light at spaced intervals of time.

3. In combination, an original film having thereon a multiplicity of lenticulations of substantially equal aperture and a group of color records behind each of said lenticulations, a copy film having similar lenticulations thereon, film gates at which said films are exposed, means for passing light through the original film to the copy film, optical means in the path of said light from the original film to the copy film and including a lens of aperture smaller than that of one of said lenticulations and disposed at one side of an axis normal to and passing through one of said films in its gate, means to rotate said optical means bodily about said axis, and a stationary diaphragm having openings corresponding in number and position to said color records and positioned to permit passage of said light at spaced intervals of time.

4. In combination, an original film having thereon a multiplicity of lenticulations of substantially equal aperture and a group of color records behind each of said lenticulations, a copy film having similar lenticulations thereon, film gates at which said films are exposed, means for passing light through the original film to the copy film, optical means in the path of said light from the original film to the copy film and including a lens of aperture smaller than that of one of said lenticulations and disposed at one side of an axis normal to and passing through one of said films in its gate, and means to rotate said lens bodily about said axis.

5. In combination, an original film having thereon a multiplicity of lenticulations of substantially equal aperture and a group of color records behind each of said lenticulations, a copy film having similar lenticulations thereon, film gates at which said films are exposed, means for passing light through the original film to the copy film, optical means in the path of said light from the orginal film to the copy film and including a lens of aperture smaller than that of one of said lenticulations and disposed at one side of an axis normal to and passing through one of said films in its gate, and means to rotate said lens bodily about said axis while maintaining its axis parallel to itself.

6. In combination, an original film having thereon a multiplicity of lenticulations of substantially equal aperture and a group of color records behind each of said lenticulations, a copy film having similar lenticulations thereon, film gates at which said films are exposed, means for passing light through the original film to the copy film, optical means in the path of said light from the original film to the copy film and including a lens of aperture smaller than that of one of said lenticulations and disposed at one side of an axis normal to and passing through one of said films in its gate, means to rotate said lens bodily about said axis, and a stationary diaphragm positioned to intercept the light passing through said lens and having openings corresponding in position and color to said color records and positioned to permit the passage of said light as the lens passes the openings.

7. In combination, an original film having thereon a multiplicity of lenticulations of substantially equal aperture and a group of color records behind each of said lenticulations, a copy film having similar lenticulations thereon, film gates at which said films are exposed, means for passing light through the original film to the copy film, means for dividing said light into a plurality of beams of light corresponding in number to the number of color records in a group and comprising a lens and reflecting means associated therewith in the path traveled by each of said beams, each lens having an aperture smaller than that of one of said lenticulations, and means for moving said lens and reflecting means transversely of said paths of light to an extent sufficient to virtually increase the aperture of each lens to an amount approximately equal to that of one of said lenticulations.

8. In combination, an original film having thereon a multiplicity of lenticulations of substantially equal aperture and a group of color records behind each of said lenticulations, a copy film having similar lenticulations thereon, film gates at which said films are exposed, means for passing light through the original film to the copy film, means for dividing said light into a plurality of beams of light corresponding in number to the number of color records in a group and comprising a lens and reflecting means associated therewith in the path traveled by each of said beams, each lens having an aperture smaller than that of one of said lenticulations, and means for rotating said lens and reflecting means about an axis normal to one of said films and passing through said film at its gate.

KURT RÄNTSCH.